(12) United States Patent
McGovern (10) Patent No.: US 12,546,492 B1
(45) Date of Patent: Feb. 10, 2026

(54) TEMPERATURE CONTROL SYSTEM WITH A SUBSURFACE INTAKE ASSEMBLY, AND A SUBSURFACE INTAKE ASSEMBLY FOR A TEMPERATURE CONTROL SYSTEM

(71) Applicant: Thomas McGovern, New York, NY (US)

(72) Inventor: Thomas McGovern, New York, NY (US)

( * ) Notice: Subject to any disclaimer, the term of this patent is extended or adjusted under 35 U.S.C. 154(b) by 0 days.

(21) Appl. No.: 18/744,665

(22) Filed: Jun. 16, 2024

(51) Int. Cl.
*F24F 5/00* (2006.01)
*F24T 10/20* (2018.01)

(52) U.S. Cl.
CPC .............. *F24F 5/005* (2013.01); *F24T 10/20* (2018.05)

(58) Field of Classification Search
CPC ... F24F 5/005; F24F 2005/0053; F24T 10/20; F24T 10/30
See application file for complete search history.

(56) References Cited

U.S. PATENT DOCUMENTS

| | | | | |
|---|---|---|---|---|
| 2,242,378 A * | 5/1941 | Vollbach | ................ | A62B 13/00 55/467 |
| 2,680,354 A * | 6/1954 | Gygax | .................... | F24F 3/044 165/45 |
| 2,828,681 A * | 4/1958 | Smith | .................... | F24F 5/0046 165/45 |
| 4,054,246 A * | 10/1977 | Johnson | .............. | F28D 20/0056 126/633 |
| 4,234,037 A | 11/1980 | Rogers et al. | | |
| 4,295,415 A * | 10/1981 | Schneider, Jr. | ....... | F24D 11/007 454/366 |
| 4,328,858 A | 5/1982 | Richter et al. | | |
| 4,393,861 A * | 7/1983 | Beard | ..................... | F24S 20/66 126/633 |

(Continued)

FOREIGN PATENT DOCUMENTS

| | | | | |
|---|---|---|---|---|
| CN | 201628369 U | 11/2010 | | |
| DE | 19826625 A1 * | 12/1999 | ............ | F24D 11/007 |

(Continued)

OTHER PUBLICATIONS

Bĕlehrádek, Martin | Earth Tube Design (for Earth Sheltered Homes) | retrieved on Apr. 5, 2024| <https://www.homeintheearth.com/tech_notes/earth-tubes/earth-tube-design-for-earth-sheltered-homes/>.

(Continued)

*Primary Examiner* — Eric S Ruppert
*Assistant Examiner* — Hans R Weiland
(74) *Attorney, Agent, or Firm* — Hanrahan Law Firm, P.A.; Benjamin M. Hanrahan, Esq.

(57) ABSTRACT

A temperature control system (TCS and a subsurface intake assembly for a TCS for a building are provided herein. The subsurface intake assembly includes one or more subsurface intake units disposed within the ground and configured to receive subsurface air. An intermediate connection assembly receives the subsurface air from the intake units and directs the subsurface air to the TCS. In order to collect the subsurface air, each of the subsurface intake units include one or more openings into which the subsurface air can flow. In this manner, the subsurface air flows from a location external to the subsurface intake unit, into the subsurface intake unit through the one or more openings, to the intermediate connection assembly, and eventually to the TCS.

22 Claims, 7 Drawing Sheets

(56) References Cited

U.S. PATENT DOCUMENTS

| | | | |
|---|---|---|---|
| 5,946,928 A | 9/1999 | Wiggs | |
| 6,293,120 B1 * | 9/2001 | Hashimoto | F28D 20/0052 165/45 |
| 8,662,147 B2 | 3/2014 | Juris | |
| 8,701,432 B1 | 4/2014 | Olson | |
| 8,726,682 B1 | 5/2014 | Olson | |
| 8,794,015 B1 | 8/2014 | Dahlen et al. | |
| 10,139,115 B2 * | 11/2018 | Lackie | F24F 3/0442 |
| 11,747,049 B2 | 9/2023 | Zaynulin et al. | |
| 2007/0056304 A1 * | 3/2007 | Everett | F24F 5/0075 62/260 |
| 2009/0145140 A1 | 6/2009 | Shapiro | |
| 2009/0260776 A1 * | 10/2009 | Calamaro | F28D 20/0052 165/45 |
| 2010/0025008 A1 | 2/2010 | Walford | |
| 2012/0125019 A1 | 5/2012 | Sami | |
| 2012/0291988 A1 * | 11/2012 | Hamlin, III | F24D 5/10 165/45 |
| 2012/0305214 A1 | 12/2012 | Wright et al. | |
| 2014/0014302 A1 | 1/2014 | Gutai | |
| 2017/0248332 A1 * | 8/2017 | Wright | F24T 10/40 |
| 2018/0195778 A1 | 7/2018 | Crawford | |
| 2018/0209714 A1 | 7/2018 | Crook | |
| 2018/0328633 A1 | 11/2018 | Jacobi | |
| 2019/0234190 A1 | 8/2019 | Takahashi et al. | |
| 2020/0033014 A1 | 1/2020 | Ballegeer | |
| 2020/0103128 A1 * | 4/2020 | Konyari | F24F 5/005 |
| 2020/0200438 A1 | 6/2020 | McBay | |
| 2020/0240664 A1 | 7/2020 | Al-Shibli | |
| 2021/0048229 A1 | 2/2021 | Niemi | |
| 2021/0164708 A1 | 6/2021 | Niemi | |
| 2021/0293421 A1 | 9/2021 | Niemi | |
| 2022/0042718 A1 | 2/2022 | Liu et al. | |
| 2022/0307738 A1 | 9/2022 | Park et al. | |
| 2024/0280277 A1 * | 8/2024 | Neufeld | F24F 5/0046 |

FOREIGN PATENT DOCUMENTS

| | | | | |
|---|---|---|---|---|
| FI | 73816 B | * | 7/1987 | |
| JP | 2005090202 A | * | 4/2005 | F24F 5/005 |
| WO | WO-9953246 A1 | * | 10/1999 | E04B 1/74 |

OTHER PUBLICATIONS

Milligan, Gordon | Earth Tubes: How to Build a Low Cost System to Passively Heat and Cool Your Home for Free | Milligan's Gander Hill Farm; A Beginning Farmer | Dec. 1, 2013 | retrieved on Apr. 4, 2024 | <https://milligansganderhillfarm.wordpress.com/2013/12/01/earth-tubes-how-to-build-a-low-cost-systemto-passivly-heat-and-cool-you>.

Roberts, Tobias | Earth Tubes: A Natural Way to Air Condition Your Home | July 10, 2017 | retrieved on Apr. 4, 2024 | <https://www.permaculturenewsorg/2017/07/10/earth-tubes-natural-way-air-condition-home/>.

* cited by examiner

TEMPERATURE CONTROL SYSTEM WITH A SUBSURFACE INTAKE ASSEMBLY, AND A SUBSURFACE INTAKE ASSEMBLY FOR A TEMPERATURE CONTROL SYSTEM

FIELD OF THE INVENTION

The present invention is generally directed to a temperature control system (TCS) for a building and a subsurface intake assembly for a temperature control system for receiving and utilizing subsurface air.

BACKGROUND OF THE INVENTION

The energy consumption of a temperature control system for a building (e.g., systems that include or utilize heat pumps, air handling units, roof top units, variable refrigerant flow systems, and other heating, ventilation and air conditioning (HVAC) systems or units) can vary greatly depending on several factors such as the size of the building, the building insulation and sealing, the size of the system or units within the system, the climate or weather, the region within which the building and system or unit resides, etc. However, in many cases, with the continued desire and need to maintain certain temperatures within residential and commercial buildings, particularly in regions that experience extreme high or low temperatures, the amount of energy consumed by a temperature control system and the individual components or units thereof of any building is often extremely high.

In an effort to reduce the overall energy consumption, some HVAC systems and other temperature control systems use geothermal techniques that extract heat from the earth's surface to raise the temperature within a building during colder months and cool the temperature within the building during warmer months.

Most geothermal systems, however, use a closed loop system of pipes to contain a refrigerant that is pumped through the pipes in the ground in an attempt to achieve the desired temperature in the building. However, not only are these closed loop geothermal systems expensive and inefficient, but even minor cracks, leaks or damage to the system can be detrimental to the surrounding environment, water supply and plant life. More specifically, if any of the pipes generate a leak, the refrigerant can seep into the surrounding environment causing irreparable damage and contamination to the water supply.

Furthermore, some geothermal systems draw groundwater, lake water, and water from other local water sources to maintain a desired building temperature, but these heat up the water sources in the summer and cool them down in the winter.

Accordingly, there is a need in the art for a new, improved geothermal or other like system for effectively and efficiently controlling the internal temperature of a building, that is safe for the environment, can decrease energy consumption, and that provides a more plentiful source of temperature gradient and overall benefit with HVAC equipment. More in particular, the proposed assembly can be used to increase the efficiency and capacity of existing HVAC systems and other temperature control systems, and provide more efficient cooling in the warmer months and heating in the cooler months.

SUMMARY OF THE INVENTION

Accordingly, some embodiments of the present invention are directed to a temperature control system (TCS) with a subsurface intake assembly, whereas other embodiments are directed to the subsurface intake assembly for a TCS. In particular, the TCS of at least one embodiment includes or otherwise uses one or more TCS units (e.g., heat pump, air handler unit, roof top unit, and other units or components of a heating, ventilation and air conditioning (HVAC) systems) and one or more subsurface intake assemblies. The subsurface intake assembly includes at least one, although in many implementations a plurality of subsurface intake units mounted or disposed within the ground to receive subsurface air, and at least one intermediate connection assembly to direct the subsurface air to or toward the one or more TCS units.

Particularly, in at least one embodiment, each of the subsurface intake units includes a top end, a longitudinally opposite bottom end, and at least one peripheral wall defining a hollow interior portion. The bottom end of the subsurface intake unit, of at least one embodiment or implementation, is disposed down in the ground a distance away from the building foundation, and in some cases, to or near the earth's bedrock where subsurface air can be collected.

Furthermore, in order to receive or collect the subsurface air, each of the subsurface intake units further include one or more openings, holes or screens through which the subsurface air can flow. The opening(s), hole(s) or screen(s) can be in the form of an open bottom end and/or one or more holes, screens, etc. spanning along at least a portion of the length of the unit. As described herein, the holes or openings can be formed in several different shapes, sizes, layouts, patterns, etc.

In this manner, the subsurface air flows or travels from a location external to the subsurface intake unit(s), into the subsurface intake unit(s) through the one or more holes or openings, to the intermediate connection assembly (which can include a manifold or header system), and eventually to the one or more TCS units. In some embodiments, the subsurface air will flow from the intermediate collection assembly to a control or collection room where one or more TCS units are disposed, and thereby exposed to the incoming subsurface air.

It should be noted that some embodiments of the present invention, and in particular, the subsurface intake assembly thereof, can be installed in new construction, e.g., during the construction phase of a new building, or in existing buildings. As described herein, the one or more subsurface intake units mounted within the ground, and particularly those mounted under the building, can provide structural support for the building, itself, while also removing or collecting subsurface air as disclosed in various embodiments herein. More in particular, one or more of the subsurface intake units provide some or all structural stability of the building to replace use of customary foundation pilings, footings, foundation members, and related building components.

BRIEF DESCRIPTION OF DRAWINGS

Like reference numerals refer to like parts throughout the several views of the drawings provided herein.

DETAILED DESCRIPTION OF THE INVENTION

Figure 1:
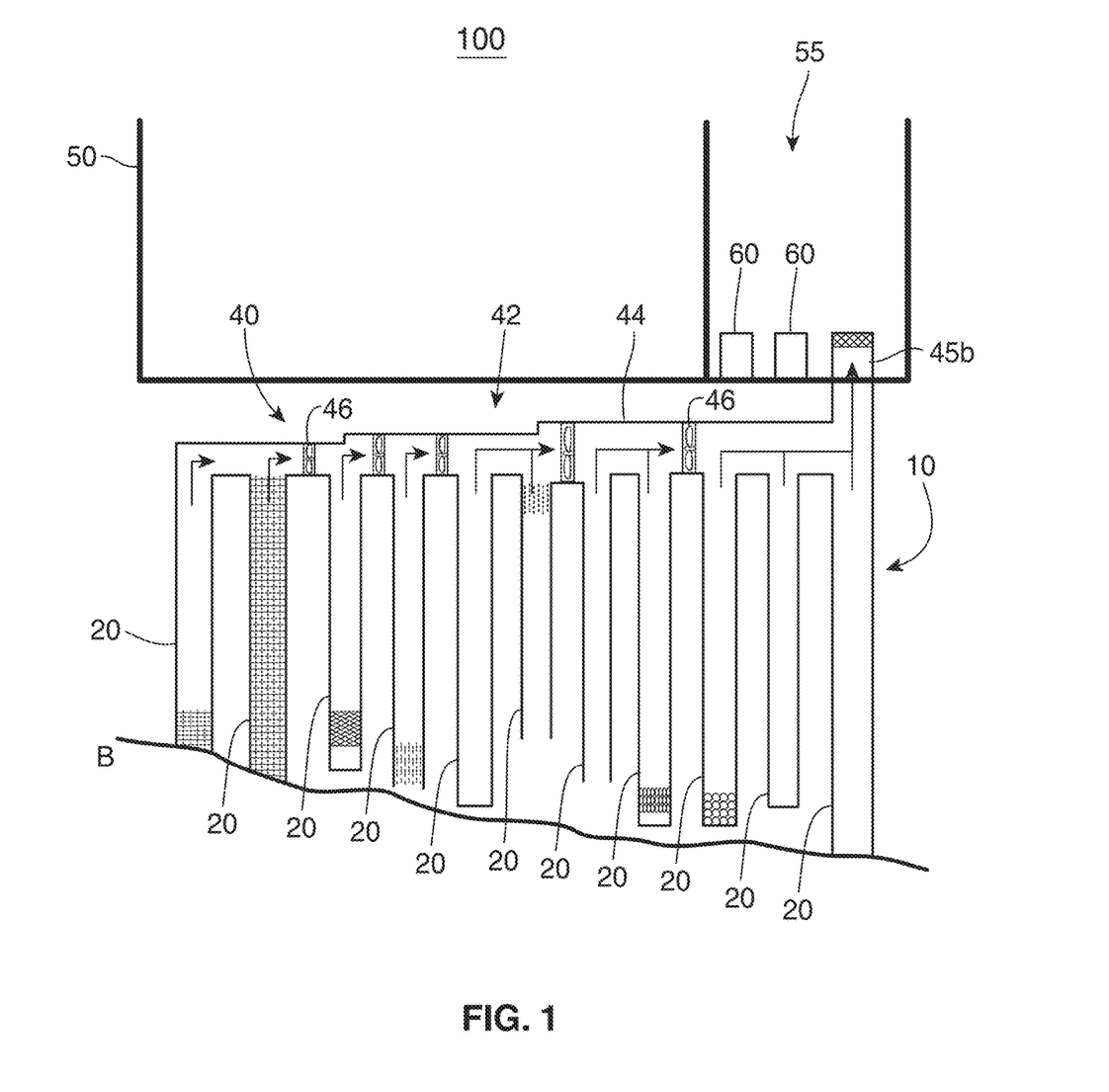
FIG. 1 is an elevation view of the TCS and subsurface intake assembly as disclosed in accordance with at least one embodiment of the present invention, with a plurality of subsurface intake units disposed beneath the foundation of a building.

As shown in the accompanying drawings, and with reference to FIG. 1, the present invention is generally directed to a temperature control system (TCS), referenced as 100, and/or a subsurface intake assembly, referenced as 10, for a building 50. The building 50 can be virtually any structure including but in no way limited to a residential building (e.g., a single-family house, a multi-family house, apartment building, etc.), a commercial building, an industrial building or structure, etc. Furthermore, the temperature control system or TCS 100, as used herein, includes, one or more TCS units 60 such as, but in no way limited to a heat pump, air handling unit, roof top unit, variable refrigerant flow system, or any other unit or component of a heating, ventilation and air conditioning (HVAC) system.

Moreover, the subsurface intake system 10 of certain embodiments of the present invention is structured and configured to collect subsurface air for use by the TCS unit(s) 60, e.g., to heat the building in winter months, and to cool the building in summer months. Subsurface air, as used herein, is air that is retrieved by the system 100 of the present invention from a location below the ground surface, or otherwise, air that is retrieved or collected from beneath the earth's surface. As described herein, the subsurface air can be collected from, within or around the bedrock B, from within a hole 30 dug or formed through the installation of the present invention, from, within or around subsurface boulders, rocks, quarries, pebbles, soil, minerals, or other subsurface solid materials, etc.

As just an example, in some embodiments, the present invention is configured to collect or direct subsurface air to a designated room 55 or location where one or more TCS units 60 are disposed and/or operating. In such a case, the TCS units 60 operating within the room 55 or location are exposed to the subsurface air of the room 55. Furthermore, in some embodiments, the present invention may blow or direct the collected subsurface air to one or more TCS units 60, across one or more coils, through the TCS unit 60 and into the building 50, etc. Moreover, the subsurface air may be used directly to heat or cool the building, to heat or cool any one of various types of coolants that are used to heat or cool the building or the subsurface air is used in any manner to heat or cool the building. In other words, the collected subsurface air can be used in various ways by any existing TCS or HVAC system, now known or later developed.

Figure 2:
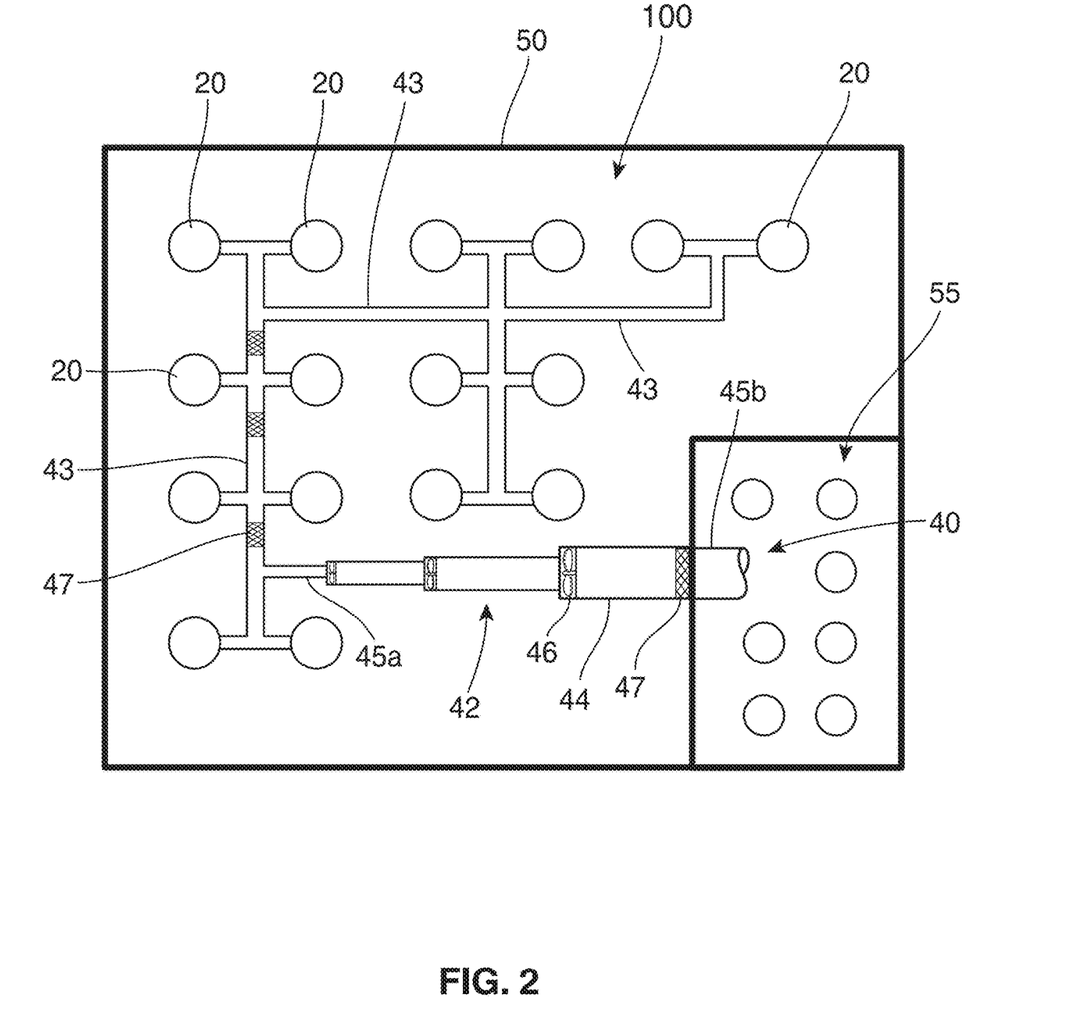
FIG. 2 is a top plan view of the TCS and subsurface intake assembly as disclosed in accordance with at least one embodiment of the present invention, with a plurality of subsurface intake units disposed beneath the foundation of a building.

For instance, still referring to FIG. 1, the subsurface intake assembly 10 of at least one embodiment of the present invention includes at least one, although in some implementations, a plurality of subsurface intake units 20 that extend into the ground or otherwise beneath the earth's surface. In some embodiments, as shown in FIGS. 1 and 2, for example, the plurality of intake units 20 are disposed beneath the building 50, for example, under the foundation of the building 50, itself.

In some cases, the one or more subsurface intake units 20 provide structural support for the building, for example, by being installed around the sides of, as part of, or in support of the building's pilings, footing, foundation, etc. In particular, the one or more subsurface intake units 20 of at least one embodiment are able to co-exist with or are used as structural support members of the building.

In other embodiments, however, the subsurface intake units 20 can be disposed in the ground in an area surrounding the building 50 or adjacent to the building 50, for example, beyond the foundational footprint of the building and out to or toward the property line(s), such that the subsurface intake units 20 do not necessarily need to be positioned under the building 50.

In other embodiments or implementations, one or more subsurface intake units 20 may be disposed directly beneath the building 50 while one or more other subsurface intake units 20 may be disposed in the ground around the periphery of or adjacent to the same building 50.

In yet another embodiment, the one or more subsurface intake units 20 may be disposed beneath or adjacent one building, but used to heat or cool another building, in addition to or instead of the building with which the intake unit(s) 20 are beneath or adjacent. In this manner, the location of the subsurface intake unit(s) 20 can vary depending on the particular environment, application or situation.

Furthermore, in at least one embodiment, in order to install a subsurface intake unit 20, a hole 30 may be drilled or otherwise formed into the ground, within which the subsurface intake unit 20 is placed. In some embodiments, each subsurface intake unit 20 will have its own hole 30, however it is also contemplated that in some cases, several (e.g., two or more) subsurface intake units 20 may occupy a single hole 30.

After the hole 30 is formed or drilled, a process of removing fines, dust, soil, rocks, pebbles, and other aggregate and related material is executed. This removal process can occur prior to the installation of the subsurface intake unit(s) 20 within the hole(s) 30, during installation of the subsurface intake unit(s) within the hole(s) 30 and/or after installation of the subsurface intake unit(s) 20 within the hole(s) 30.

As just an example, each hole 30 may have a diameter of approximately three to thirty-six inches, although virtually any size greater than thirty-six inches or less than three inches is contemplated within the full spirit and scope of the present invention. The subsurface intake unit(s) 20 may be in the form of rigid, semi-rigid or flexible pipes that do not compromise the building foundation or structural integrity.

Figure 3:
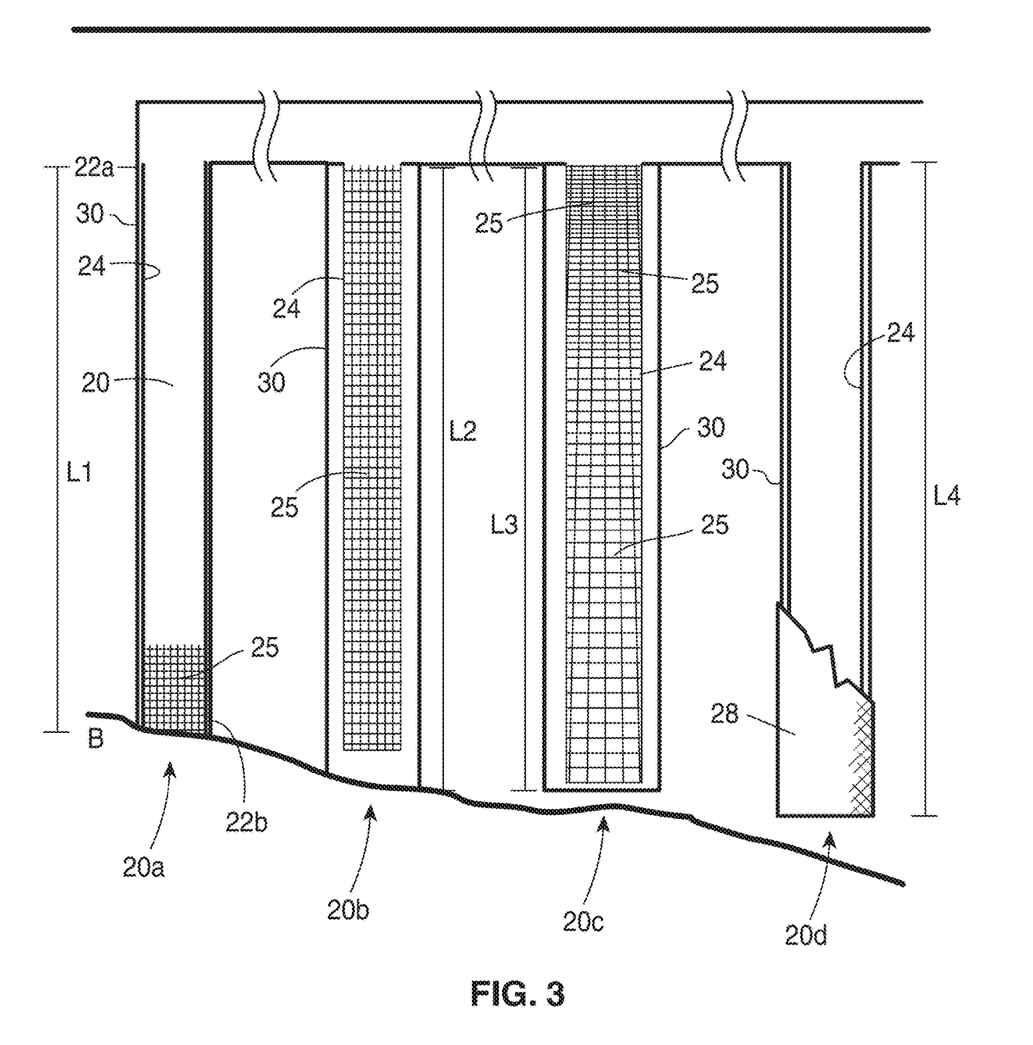
FIG. 3 is an elevation view of several exemplary subsurface intake units as disclosed in connection with several embodiments of the present invention.

Moreover, in the embodiment illustrated in FIGS. 1 and 3, for example, the holes 30 may be a substantially straight-line hole that is vertically oriented into the ground, or otherwise substantially orthogonal to the surface of the ground. In this manner, the subsurface intake unit 20 disposed therein, is a straight-line or linear unit and will be positioned in a vertical orientation within the ground, or otherwise substantially orthogonal to the surface of the ground. However, it should be noted that other orientations of the hole 30 (and the subsurface intake unit 20) are contemplated in that, in other embodiments or implementations, the hole 30 and/or the subsurface intake unit 20 may not be vertical or orthogonal to the surface of the ground, and in some cases, may be non-linear. To put it another way, the holes 30 and/or the subsurface intake units 20 may be angularly disposed within the ground, at any angle, and/or may have one or more curves, angles, turns, etc. along the length or within the ground, in such a manner to best capture subsurface air.

More specifically, still referring to the embodiment illustrated in FIGS. 1 and 3, each of the subsurface intake units 20 of at least one embodiment include a first end or top end, referenced as 22a, and a second end or bottom end, referenced as 22b. In the embodiment shown, the subsurface intake unit 20 is linear and the bottom end 22b is longitudinally opposite the top end 22a. As described above, other shapes, including non-linear shapes of the subsurface intake units 20 are contemplated and are within the full spirit and scope of the present invention.

Furthermore, the subsurface intake units 20, of the various embodiments disclosed herein, include at least one peripheral wall 24 formed between the first or top end 22a and the second or bottom end 22b. For instance, in some cases, the subsurface intake unit(s) 20 are in the form of a pipe, tube, duct or other like generally cylindrical structure with a circular or oval horizontal or lateral cross-section (orthogonal to a longitudinal axis), such that a single, continuous peripheral wall 24 encloses or partially encloses a hollow interior portion thereof. In other cases or embodiments, the subsurface intake unit(s) 20 may include virtually any horizontal or lateral cross-sectional shape (e.g., triangular, square, rectangular, or other polygonal shape) such that a single subsurface intake unit 20 may include a plurality of peripheral walls 24 enclosing or partially enclosing the hollow interior portion thereof.

Furthermore, each of the subsurface intake units 20 include a length L1-L3 defined or measured between the top end 22a and the corresponding bottom end 22b. As shown in the exemplary embodiments of FIGS. 1 and 3, the intake assembly 10 of at least one embodiment may include a plurality of subsurface intake units 20, some of which have different lengths as compared to the others. In other words, lengths L1-L3 of the various subsurface intake units 20 in the same intake assembly 10 or installation may be equal and/or unequal. This may depend on several factors, including the particular goals of the system, the distance to the bedrock B, the regional or geographic location of the system, the particular soil and rock profile in the ground at the location, etc.

For example, as shown in FIG. 3, in some cases, one or more of the subsurface intake units, as referenced at 20a, may extend all the way down to the bedrock B layer of the earth, while one or more other subsurface intake units, as referenced at 20b-c, may not extend all the way to the bedrock B. More specifically, the bedrock B is a rocky layer within the earth's surface that often underlies looser surface materials, such as soil, subsoil, sand, and other regolith. The depth of the bedrock B from the top surface of the ground can vary significantly depending on the location (and other factors) and can range from less than a foot up to several hundred feet or more.

Referring to subsurface intake unit 20a in FIG. 3, the bottom end 22b may contact or engage the bedrock B, and in some cases may be physically connected or attached to the bedrock B, for example, using a connection mechanism such as a brace, one or more fastener(s), other hardware, an adhesive, etc. The brace or connection mechanism can help provide structural stability for the TCS, building or intake unit(s). For example, this embodiment may be used in new construction or existing construction to provide structural support for a new building or existing building, while also removing subsurface air for the TCS. For new construction, the subsurface intake units provide some or all structural stability of the building to replace use of customary foundation pilings, footings, foundation members, and related building components.

Subsurface intake unit 20b is shown extending close to but not engaging the bedrock B, while the corresponding hole 30 within which the subsurface intake unit 20b is disposed does extend all the way to the bedrock B.

Furthermore, in some embodiments or implementations, both the subsurface intake unit 20c and the hole 30 within which it is disposed stop short of, or otherwise do not extend all the way down to the bedrock B.

Still referring to FIG. 3, each of the subsurface intake units 20 includes one or more openings, generally referenced as 25, for receiving subsurface air therethrough. More specifically, subsurface air, as used herein, includes air that is, at one point, external to the subsurface intake unit 20 and below the earth's surface. The subsurface air may, in some cases, flow through or within the porous bedrock B layer or may flow through the hole 30 at least initially between the outer surface of the subsurface intake unit 20 and the inner surface of the hole 30. In any case, the subsurface air will flow from a position external to the subsurface intake unit(s) 20, through the one or more openings 25 and into the interior portion of the subsurface intake unit 20. It should also be noted that in certain cases or embodiments, the subsurface intake unit(s) 20 and subsurface air flowing therethrough may extract heat or cool temperatures from rock, soil, substrata ground material for purposes of providing greater winter heat or summer cooling.

Figure 5A:
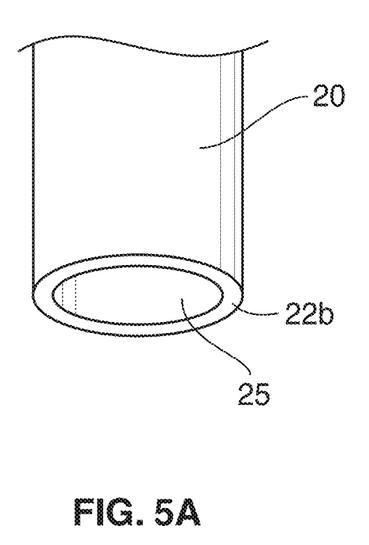
FIG. 5A is a bottom perspective view of a subsurface intake unit with an at least partially open bottom end as disclosed in connection with at least one embodiment of the present invention.

For example, with reference to FIG. 5A, the at least one opening 25 through which the subsurface air flows can, in at least one embodiment, include an at least partially open bottom end 22b, or otherwise a hole or opening disposed on the bottom end or extremity of the pipe or other subsurface intake unit 20. In this case, subsurface air can flow into the subsurface intake unit 20 through the at least partially open bottom end 22b or otherwise through the at least one opening or hole 25 disposed on the bottom end 22b and into the hollow interior portion thereof, where the air will be directed to the TCS, as described herein.

Figure 5B:
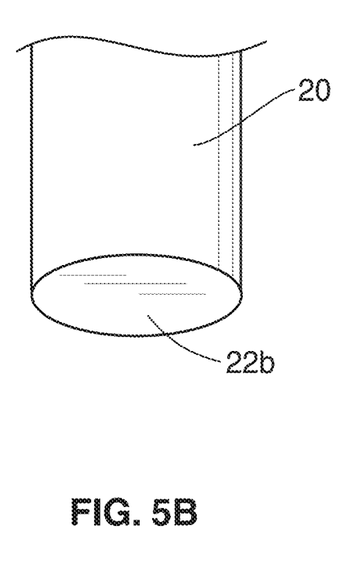
FIG. 5B is a bottom perspective view of a subsurface intake unit with a closed bottom end as disclosed in connection with at least one embodiment of the present invention.

FIG. 5B shows an example where the bottom end 22b is closed or otherwise does not include an opening or hole thereon.

It should be noted that with a hole or opening 25 on the bottom end 22b (e.g., as shown in FIG. 5A), the peripheral wall(s) 24 may, in some cases, be solid or otherwise impermeable by air such that the only opening 25 is at the bottom end 22b of the subsurface intake unit 20. In other cases, however, as will be described below, regardless of whether the subsurface intake unit 20 includes an opening 25 at the bottom end 22b (FIG. 5A) or whether the subsurface intake unit 20 includes a solid, closed bottom end 22b (FIG. 5B), the peripheral wall(s) 24 may include one or more intake holes defined along at least a portion of the length L1-L3 of the subsurface intake unit 20.

For example, with reference to FIG. 3, subsurface intake unit 20a includes a plurality of intake holes 25 disposed along the length L1 of the unit 20a. In the example shown, the plurality of holes or openings 25 are shown extending from the bottom end 22b and up the side of the unit 20a. In this manner, the openings or holes 25 disposed at or near the bottom end 22b are positioned to collect or otherwise receive subsurface air from the bedrock B. However, it should be noted that the holes or openings 25 can be disposed along virtually along location along the length L1 of the unit 20a.

Furthermore, the holes or openings 25 can be disposed along a minor portion (e.g., less than half) of the length L1 of the subsurface intake unit 20a, a major portion (e.g., more than half) of the length of the subsurface intake unit, or the entire length L2, L3 or approximately the entire length of the subsurface intake unit 20b, 20c.

As just an example, at least a portion of the peripheral wall 24 of the subsurface intake unit 20 may be formed of or otherwise include a screen or mesh-like material with a plurality of holes or openings that may include a diameter or width of approximately one millimeter (or less) up to one inch (or more). In some cases, the holes or openings 25 may be uniformly shaped and sized, such that all of the holes or openings 25 on the unit 20 are the same, identical or nearly identical shape and size.

In other cases, the holes or openings 25 may vary in shape and/or size throughout the unit 20. For instance, at least one of the intake holes at a first location along said length of the at subsurface intake unit (e.g., toward the top end may include a size (e.g., a diameter or opening size) that is different than (e.g., larger or smaller that) a size of another one of the holes at a second location along the length of the subsurface intake unit (e.g. toward the bottom end). This variation in opening size can be used to correspond with the soil conditions. For example, if the soil at shallower depths is finer than the soil at deeper depths, the openings or the size of the holes 25 (e.g., the diameter or width of the holes) may increase from top to bottom, whereas the holes or openings 25 at or near the top of the unit 20 may be smaller than the holes or openings at or near the bottom of the unit 20. The reverse may also, or instead, be implemented—e.g., the holes or openings 25 at or near the top of the unit 20 may be larger than the holes or openings at or near the bottom of the unit 20.

In some cases, the intake units 20 may extend around the circumference or outer periphery of the unit 20 while in other cases, one or more holes or openings 25 may be disposed only along one side of the intake unit 20, along two sides, or otherwise only along or on a portion of the circumference.

It should also be noted that the different variations of the subsurface intake units 20a-d shown in FIG. 3 are for exemplary purposes only in that the subsurface intake assembly 10 of the various embodiments may include or be assembled with any one of the examples shown 20a-d, a combination of several of the examples shown 20a-d, or other variations as disclosed herein and as appropriate for the particular installation.

Figure 4A:
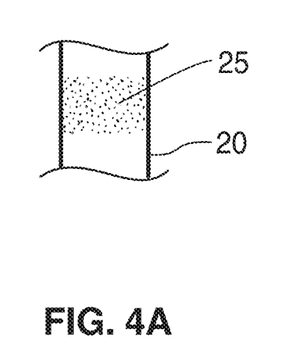
FIGS. 4A-4H illustrate several exemplary openings formed upon the peripheral wall of a subsurface intake unit as disclosed in connection with several embodiments of the present invention.
Figure 4B:
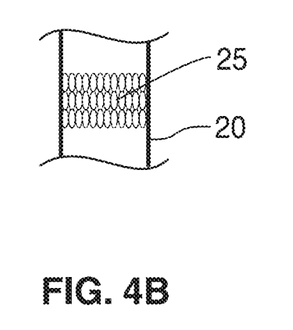
Figure 4C:
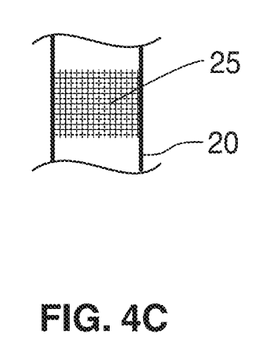
Figure 4D:
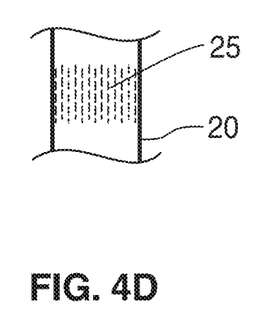
Figure 4E:
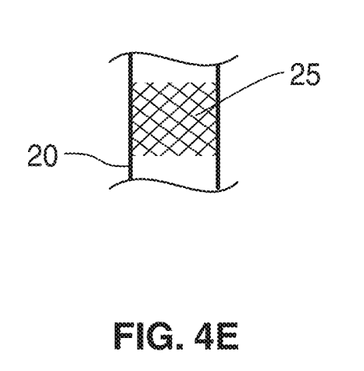
Figure 4F:
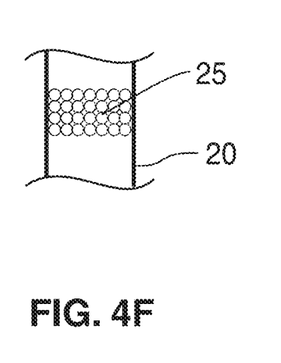
Figure 4G:
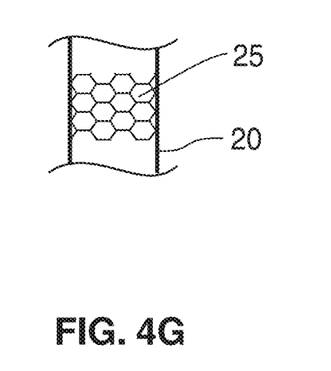
Figure 4H:
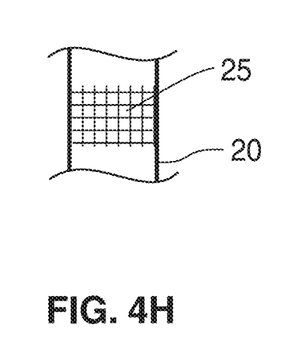

For instance, FIGS. 4A-4H illustrate different holes or openings 25 that can be implemented in connection with the various embodiments of the present invention. For example, the holes or openings 25 may be in the form of small pinhole type openings (FIG. 4A), oval slots (FIG. 4B), screen-type openings (FIG. 4C), elongated slits (FIG. 4D), diamond-shaped openings (FIG. 4E), circles (FIG. 4F), various geometric shapes (e.g., squares, rectangles, pentagons, hexagons, etc.) (FIG. 4G), square-shaped openings (FIG. 4H). Other shapes, sizes, layouts, patterns, etc. of the openings 25 are contemplated and within the full spirit and scope of the present invention, and those examples shown in the drawings should not be considered limiting.

Furthermore, referring again to FIG. 3, in some embodiments, the assembly 10 of at least one embodiment includes a protective sleeve or covering 28 wrapped around, wrapped at least partially around, or otherwise disposed in a covering relation with at least a portion of the subsurface intake unit 20, particularly, over or around the one or more openings 25. The sleeve or covering may be made of a porous fabric or other type of material that is capable of allowing the subsurface air to flow therethrough while also filtering, preventing or restricting the flow of sand, soil, dirt, silt, dust, fine materials, aggregate or other deleterious materials into the interior portion of the subsurface intake unit 20.

Referring again to FIGS. 1-3, the assembly 10 of at least one embodiment includes one or more intermediate connection assemblies, generally referenced as 40, which is disposed between the one or more subsurface intake units 20 and the TCS units 60. More specifically, the intermediate connection assembly 40 of at least one embodiment includes a manifold or header, referenced as 42, interconnected to the subsurface intake units 20 to direct the flow of air therefrom to the TCS unit(s) 60. In particular, the manifold or header 42 may include a series of interconnected pipes or conduits 43 which interconnect the various subsurface intake units 20 to at least one end conduit 44. FIG. 2 illustrates an exemplary layout of a plurality of subsurface intake units 20 interconnected to one another through a series of conduits 43, that are fluidically connected to end pipe 44.

In some cases, the end pipe 44 may, but need not necessarily, include a stepped pipeline such that the diameter of the pipeline increases between a first end 45a and an outlet or second end 45b. It should be noted that the end pipe 44 may be formed as a single-piece or multiple pieces with expansion fittings causing the increased or stepped configuration.

Moreover, the intermediate connection assembly 40 of at least one embodiment also includes one or more fans, generally represented as 46 and one or more air or particulate filters, generally represented as 47.

As shown, for example, in FIGS. 1 and 2, the one or more fans 46 can be disposed along the length of the intermediate connection assembly 40, such as, within the manifold or header 42. In this manner, the fan(s) 46 can be disposed within the end pipe 44 and/or within the connection conduits 43, and operate to draw the subsurface air through the subsurface intake units 20, through the intermediate connection assembly 40, and to the outlet or second end 45b, as shown through the arrows in FIG. 1.

Similarly, the one or more filter(s) 47 can be disposed along the length of the intermediate connection assembly 40, such as, within the manifold or header 42. In this manner, the filter(s) 47 can be disposed within the end pipe 44 and/or within the connection conduits 43, and operate to filter out any sand, dirt, soil, aggregate and/or particulates from the air passing therethrough. In many cases, the filter(s) 47 are intended or otherwise structured to remove fine silts and other aggregate from the air, while also reducing pressure drop to maximize the system effectiveness.

More specifically, in some embodiments or implementations, the one or more fans 46 may be disposed at any one or more of the follow locations: within the control room 55, along or within the intermediate collection assembly 40, at or near the top end 22a of the subsurface intake units 20, along or within the subsurface intake units 20, etc. In this manner, the location(s) of the fans 46 shown in the drawings are for illustrative or exemplary purposes only and should not be considered limiting.

Similarly, in some embodiments or implementations, the one or more filters 47 may be disposed at any one or more of the follow locations: within the control room 55, along or within the intermediate collection assembly 40, at or near the top end 22a of the subsurface intake units 20, along or within the subsurface intake units 20, etc. In this manner, the location(s) of the filters 47 shown in the drawings are for illustrative or exemplary purposes only and should not be considered limiting.

Accordingly, in at least one embodiment of the present invention, a flow of air (e.g., the subsurface air) travels from a location external to the subsurface intake unit(s) 20 (e.g., from within the bedrock B, between the subsurface intake unit 20 and the inner surface of the hole, etc., from subsurface boulders, rocks, quarries, pebbles, soil, minerals, or other subsurface solid materials) into the subsurface intake unit(s) 20 through one or more of the openings 25 disclosed herein. From within the subsurface intake unit(s) 20, the air flows to and through the intermediate connection assembly 40 to an area where it can ultimately be used by a TCS units(s) 60. As described herein, one or more fans 46 can operate to facilitate the flow of air through the assembly 10, and one or more filters 47 can operate to filter out any unwanted matter, soil, dirt, particulates, etc.

Figure 6:
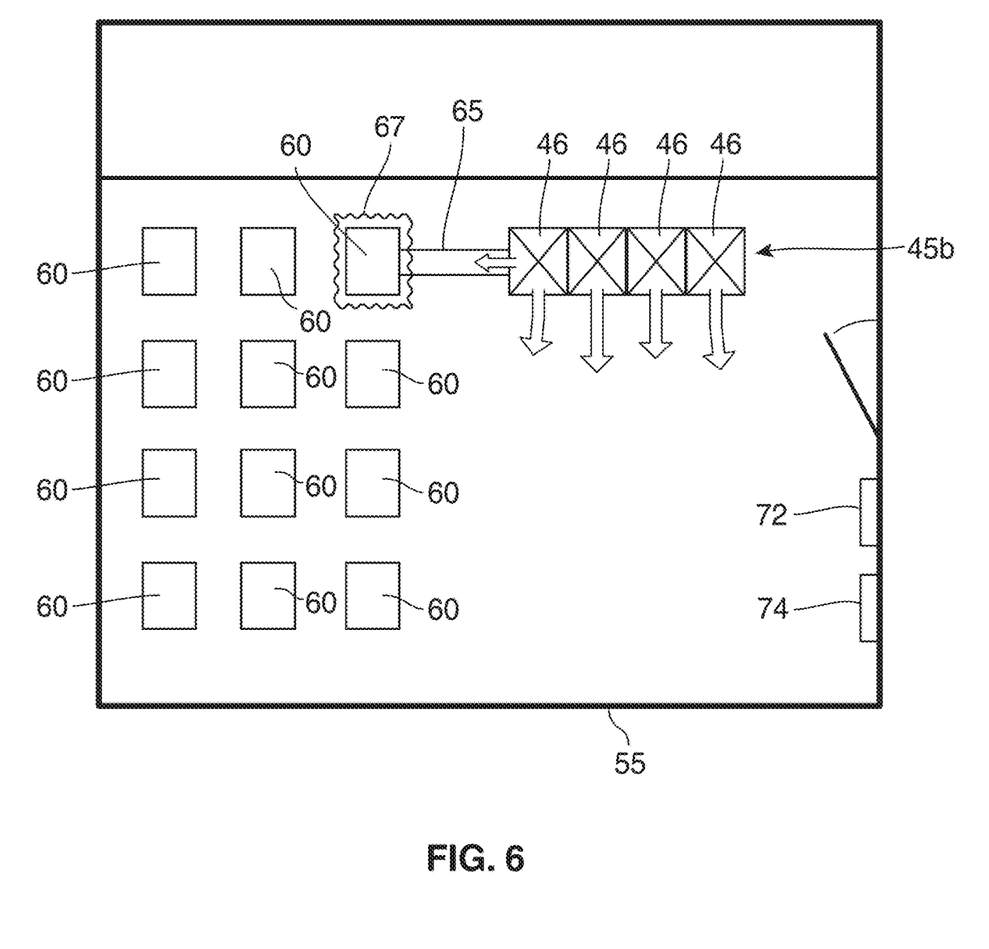
FIG. 6 is a top plan view of the control room as disclosed in accordance with at least one embodiment of the present invention.

As shown in FIGS. 1, 2 and 6, in at least one embodiment, the collected subsurface air will flow to a collection room or control room, generally referenced as 55 where the subsurface air is exposed to one or more TCS units 60. For example, the room 55 may include an outlet end 45b communicative with the intermediate collection assembly 40 where the subsurface air flows into the room, thereby filling or mixing with the air within the room. In some cases, such as in the embodiment shown in FIG. 6, several fans 46 may be used draw air from the intermediate connection assembly 40 and into the control room 55. In at least one embodiment, one or more TCS units 60 (heat pumps, air conditioners, or other components of a heating, ventilation and air conditioning (HVAC) systems) can be disposed. With the subsurface air flowing into the room 55, the components disposed therein, including the one or more TCS units 60, are exposed to the subsurface air therein.

In some embodiments, the intermediate collection assembly may directly or indirectly connect with one or more TCS unit(s) 60 through the use of one or more pipes conduits, etc. 65 between the outlet 45b and the TCS unit 60. In such a case, instead of (or in addition to) the subsurface air flowing into the room, itself, the subsurface air may be specifically routed to one or more of the TCS units 60.

The TCS unit(s) 60 may, thus, be insulated or otherwise at least partially wrapped in an insulation material 67 to maximize the efficiency, to contain subsurface air therein, and/or to direct subsurface air directly around the CS unit 60 and not into the room 55, as a whole. In some cases, the room 55 itself may include insulation material around its periphery, internal or external walls, ceiling, floor, etc. to create an air-tight space and to more effectively contain the subsurface air therein. In such a case, with the subsurface air directed into the open air of the room 55, the TCS units 60 can use the subsurface air in the room to provide heating or cooling in the building, rather than only inside of the insulation material 67, as provided in other embodiments disclosed herein.

Also within the collection or control room 55 there may be one or more control units, generally referenced as 72, 74, such as control units or panels for the building management system (BMS) or building automation system (BAS). For instance, the control units 72, 74 may be used to control an interrelation of temperature and/or flow rate of subsurface air with reclaimed building air and/or with air inside of the control room 55 prior to the TCS unit 60 in order to maximize the effectiveness of the system prior to the TCS unit(s) 60. Furthermore, the control units 72, 74 may be used to control an interrelation of temperature and/or flow rate of reclaimed building air with air inside of the control room 55, and building air after the TCS unit 60 in order to maximize the effectiveness of the system after the TCS unit(s) 60. In other words, the control unit(s) 72, 74 may be used to maximize performance and/or tweak the operations of the components of the system, including for example the fan(s), filter(s), etc., monitor sensors that may indicate when the system needs to be cleaned (e.g., when the intake units need to be cleaned, when the filters need to be replaced, etc.)

In this manner, air from within the building can be reclaimed or otherwise routed to mix, blend or merge with the subsurface air in order to preheat or precool the subsurface air before the TCS unit(s) 60. The mixing, blending or merging of the reclaimed building air may occur within the open space of the room 55, within collection units, within one or more conduits or pipes, etc.

Furthermore, in some embodiments, various pipes, coils, strata and other materials may be included and used to provide preheating and/or precooling of the subsurface air prior to exposure to with or to the TCS unit(s) 60.

In some embodiments, the system 100 may be selectively or periodically shut down (e.g., turned off), either manually or automatically, for example, using one of the control units 72, 74. During shut-down, the subsurface intake units 20, intermediate collection assembly 40, fans, filters, etc. can be cleaned, replaced or otherwise checked for maintenance purposes. Routine replacement of screens, mesh panels, end caps, filters, fans, fan parts, etc. can be accomplished to preserve maximum flow of subsurface air to the TCS unit(s) 60.

Furthermore, the control room 55 may be used to store the heated/cooled subsurface air, for example, at night or during the day, for subsequent use during warmer or colder periods. In other cases, one or more separate storage containers may be used to collect the subsurface air for subsequent use. For example, the separate collection units or storage containers may be at least partially filled with gel, solid, liquid or other material(s) (e.g., to provide multiplicative heat or cool storage) and may be used to collect the subsurface air, heat or cool, for subsequent use. The collection units or storage containers may be disposed within the collection room or control room 55, or other location(s).

It should be noted that the subsurface intake unit(s) 20 (including the peripheral wall, mesh, screen, etc., thereof), and the intermediate collection assembly 40, can be made of various materials, including but in no way limited to various plastics, metals, or combination thereof, including rigid, semi-rigid and flexible materials. The type of materials can be dependent on the particular region or location, the environmental characteristics, or the desired efficiency, or durability, etc. For example, in some embodiments, at least one or more of the subsurface intake unit(s) may be used in new construction or existing construction to provide structural support for a new building or existing building, while also removing subsurface air for the TCS. For instance, the subsurface intake units may provide at least some or all structural stability of the building to replace, complement or supplement the use of customary foundation pilings, footings, foundation members, and related building components.

In other embodiments, the intake unit(s) 20, or at least one of the intake units 20, may not be in the form of a pipe, tube, etc., but rather may include virtually any structure within the ground that is configured to extract subsurface air for use by the TCS unit(s), as described herein.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

The invention claimed is:

1. A subsurface intake assembly for a temperature control system for a building, said subsurface intake assembly comprising:
    a plurality of subsurface intake units extending into the ground,
    each of said plurality of subsurface intake units comprise a top end, a bottom end and at least one peripheral wall, said at least one peripheral wall defining a hollow interior portion, said bottom end being longitudinally opposite from said top end,
    each of said plurality of subsurface intake units further comprise a length defined between said top end and said bottom end,
    each of said plurality of subsurface intake units further comprising at least one opening for receiving subsurface air there through and into said plurality of subsurface intake units,
    wherein at least one of said plurality of subsurface intake units comprises a plurality of intake holes defined along at least a portion of said length thereof, said plurality of intake holes increasing in size along said length of said plurality of subsurface intake units from a lower depth to a greater depth in the ground, and
    at least one intermediate connection assembly disposed between said plurality of subsurface intake units and the temperature control system for the building, said at least one intermediate connection assembly comprising an outlet end disposed within and open into a control room,
    wherein a flow of the subsurface air travels from a location initially external to said plurality of subsurface intake units, into said plurality of subsurface intake units, through said at least one intermediate connection assembly, and out of said outlet end, where the subsurface air mixes with air within the control room and is then exposed to the temperature control system for the building.

2. The subsurface intake assembly as recited in claim 1 wherein at least one of said plurality of subsurface intake units is disposed under a foundation of the building.

3. The subsurface intake assembly as recited in claim 2 wherein said at least one of said plurality of subsurface intake units provides structural support for the building.

4. The subsurface intake assembly as recited in claim 1 wherein said intermediate connection assembly comprises at least one manifold in communication with a top end of each of said plurality of subsurface intake units.

5. The subsurface intake assembly as recited in claim 1 wherein at least one of said plurality of subsurface intake units extends down to the bedrock within the ground.

6. The subsurface intake assembly as recited in claim 1 wherein at least one of said plurality of subsurface intake units comprises a bottom end above the bedrock within the ground.

7. The subsurface intake assembly as recited in claim 1 further comprising a porous protective sleeve wrapped around at least a portion of an exterior surface of said at least one peripheral wall and in a covering relation to said at least one opening.

8. The subsurface intake assembly as recited in claim 1 wherein said at least one opening of at least one of said plurality of subsurface intake units is disposed on said bottom end thereof, through which subsurface air flows into said at least one of said plurality of subsurface intake units.

9. The subsurface intake assembly as recited in claim 1 wherein said bottom end of at least one of said plurality of subsurface intake units is closed.

10. The subsurface intake assembly as recited in claim 1 wherein said at least one peripheral wall of at least one of said plurality of subsurface intake units is impermeable by air while said at least one opening is disposed only on said bottom end thereof.

11. A subsurface intake assembly for a temperature control system for a building, said subsurface intake assembly comprising:
    at least one subsurface intake unit,
    said at least one subsurface intake unit comprises a top end, a bottom end and at least one peripheral wall defining a hollow interior portion, said bottom end being longitudinally opposite from said top end,
    said at least one subsurface intake unit further comprises a length defined between said top end and said bottom end,
    said at least one subsurface intake unit further comprises at least one opening for receiving subsurface air there through,
    at least one intermediate connection assembly disposed between said at least one subsurface intake unit and at least one temperature control system unit, and
    at least one fan disposed within said at least one intermediate connection assembly to draw the subsurface air through said at least one subsurface intake unit and through said at least one intermediate connection assembly,
    wherein a flow of the subsurface air travels from a location initially external to said at least one subsurface intake unit, into said at least one subsurface intake unit, through said at least one intermediate connection assembly and to the temperature control system unit for the building.

12. The subsurface intake assembly as recited in claim 11 wherein said at least one subsurface intake unit extends down to the bedrock within the ground.

13. The subsurface intake assembly as recited in claim 11 wherein said at least one opening of said at least one subsurface intake unit comprises a plurality of intake holes defined along at least a portion of said length thereof.

14. The subsurface intake assembly as recited in claim 13 wherein said plurality of intake holes increase in size along said length of said at least one subsurface intake unit from a lower depth to a greater depth in the ground.

15. The subsurface intake assembly as recited in claim 11 wherein said intermediate connection assembly comprises an outlet end communicative with a control room, wherein the subsurface air flows out of said outlet end of said intermediate connection assembly and mixes with air within the control room before being exposed to the temperature control system.

16. The subsurface intake assembly as recited in claim 11 wherein said at least one opening of said at least one subsurface intake unit is disposed on said bottom end thereof, wherein the subsurface air flows into said at least one subsurface intake unit through said bottom end and to said intermediate connection assembly.

17. The subsurface intake assembly as recited in claim 1 further comprising at least one fan and at least one filter disposed within said at least one intermediate connection assembly, said at least one fan being configured to draw the subsurface air through said plurality of subsurface intake units and through said at least one intermediate connection assembly.

18. The subsurface intake assembly as recited in claim 1 wherein the subsurface air is preheated or precooled before being exposed to the temperature control system for the building.

19. The subsurface intake assembly as recited in claim 1 further comprising a plurality of holes formed into the ground within which said plurality of subsurface intake units are disposed, wherein at least one of said plurality of holes includes at least two of said plurality of subsurface intake units disposed therein.

20. A subsurface intake assembly for a temperature control system for a building, said subsurface intake assembly comprising:
    a plurality of subsurface intake units extending into the ground,
    each of said plurality of subsurface intake units comprise a top end, a bottom end and at least one peripheral wall, said at least one peripheral wall defining a hollow interior portion, said bottom end being longitudinally opposite from said top end,
    each of said plurality of subsurface intake units further comprise a length defined between said top end and said bottom end,
    each of said plurality of subsurface intake units further comprising at least one opening for receiving subsurface air there through and into said plurality of subsurface intake units,
    wherein said at least one peripheral wall of at least one of said plurality of subsurface intake units is impermeable by air while said at least one opening is disposed only on said bottom end thereof, and
    at least one intermediate connection assembly disposed between said plurality of subsurface intake units and the temperature control system for the building, said at least one intermediate connection assembly comprising an outlet end disposed within and open into a control room,
    wherein a flow of the subsurface air travels from a location initially external to said plurality of subsurface intake units, into said plurality of subsurface intake units, through said at least one intermediate connection assembly, and out of said outlet end, where the subsurface air mixes with air within the control room and is then exposed to the temperature control system for the building.

21. A subsurface intake assembly for a temperature control system for a building, said subsurface intake assembly comprising:
    a plurality of subsurface intake units extending into the ground,
    each of said plurality of subsurface intake units comprising at least one opening for receiving subsurface air there through and into said plurality of subsurface intake units,
    at least one intermediate connection assembly disposed between said plurality of subsurface intake units and the temperature control system for the building, said at least one intermediate connection assembly comprising an outlet end disposed within and open into a control room, and
    at least one fan and at least one filter disposed within said at least one intermediate connection assembly, said at least one fan being configured to draw the subsurface air through said plurality of subsurface intake units and through said at least one intermediate connection assembly,
    wherein a flow of the subsurface air travels from a location initially external to said plurality of subsurface intake units, into said plurality of subsurface intake units, through said at least one intermediate connection assembly, and out of said outlet end, where the subsurface air mixes with air within the control room and is then exposed to the temperature control system for the building.

22. A subsurface intake assembly for a temperature control system for a building, said subsurface intake assembly comprising:
    a plurality of holes formed into the ground,
    a plurality of subsurface intake units each disposed within at least one of said plurality of holes formed into the ground, wherein at least one of said plurality of holes includes at least two of said plurality of subsurface intake units disposed therein,
    each of said plurality of subsurface intake units comprising at least one opening for receiving subsurface air there through and into said plurality of subsurface intake units, and
    at least one intermediate connection assembly disposed between said plurality of subsurface intake units and the temperature control system for the building, said at least one intermediate connection assembly comprising an outlet end disposed within and open into a control room,
    wherein a flow of the subsurface air travels from a location initially external to said plurality of subsurface intake units, into said plurality of subsurface intake units, through said at least one intermediate connection assembly, and out of said outlet end, where the subsurface air mixes with air within the control room and is then exposed to the temperature control system for the building.

* * * * *